INVENTOR.
JACK N. FUNK
RICHARD V. RAMSEY
BY
Ronald W. Mayes
ATTORNEY

United States Patent Office 3,387,120
Patented June 4, 1968

3,387,120
DAMAGE INTELLIGENCE SYSTEM
Jack N. Funk and Richard V. Ramsey, Wichita, Kans., assignors to The Boeing Company, Wichita, Kans., a corporation of Delaware
Filed Aug. 7, 1963, Ser. No. 300,496
9 Claims. (Cl. 235—150.2)

ABSTRACT OF THE DISCLOSURE

Vertical and lateral aircraft airframe acceleration-load-stress sensors cooperate with circuits computing allowable load stresses (ALF) empirically related to fatigue structural failures as described by Minor's Theory, wherefrom displays shown these sensed and calculated acceleration stress loads along with a display counter of their comparison, which count is relevant of the fatigue life of the airframe.

---

This invention relates to means for recording and/or displaying certain of the phenomena encountered in aircraft flights. More particularly this invention relates to means for recording and/or displaying the magnitude and number of times an operational device, such as an aircraft, is stressed beyond a given level.

With the advent of high performance jet aircraft has come the problem of the airframe being seriously damaged or destroyed due to unpredictable and dangerous atmospheric disturbances, buffeting and otherwise continuously stressing an airframe while in flight.

Fatigue failure is particularly dangerous since incipient cracks are often invisible and final failure may occur with disasterous suddenness in high-speed vehicles. The progress of a crack in its early stages is extremely slow, and loses attendant with fatigue failure may therefore be largely avoided if special inspection means are employed. The frequency of inspection should be based on the severity of usage of the vehicle if effective control is to be maintained.

Thus, variations in handling, maintenance, and flying conditions make highly desirable the obtaining of accurate determinations of fatigue life of an airframe structure such as by a counting of stress repetitions in the form of exceedances of computed load factors. Fatigue refers to the failure of materials under action of repeated stresses. It is responsible for a large proportion of failures occurring in metal parts. A more scientific explanation is that fatigue failure is the result of slip occurring along certain crystallographic directions accompanied by local crystal fragmentation rupturing the atomic bonds, and thus leading to the formation of submicroscopic cracks which become visible cracks.

Repeated stress application over and above a nominal cyclic endurance limit of a material is known to adversely affect its service life. Inasmuch as good over-all correlation does not exist between fatigue properties and any other mechanical property of a material, it is necessary to make a separate determination of the fatigue life of a composite structure and its material.

The basic requirement, therefore, is the provision of a system that can quantitatively sense the dynamic behavior of a significant variable, or variables, and extract from these data information pertinent to the fatigue life of an airframe. The system must take into account the best variable predicion of airframe wear from cyclic loading, and combine this information with data sensed in flight, to provide an immediate indication of "damage rate" as well as an unbroken record of progressive wear. Cyclic endurance limit is the stress value which will not produce failure, regardless of the number of applied cycles. The stress endured may then be plotted against the number of cycles sustained before failure at each of the various stress values. This is called a stress-cycle (S–N) diagram. Instead of recording the data on Cartesian coordinates, stress is plotted as either versus the logarithm of the number of cycles or both stress and cycles are plotted to logarithmic scales. Both diagrams display a relatively sharp bend in the curve near the endurance limit for ferrous metals. Non-ferrous metals used in aircraft usually shown less clearly defined endurance limits. The S–N curves in these cases indicate a continuous decrease in stress values to several hundred million cycles, and both the stress value and the number of cycles should be recorded.

The means stress has a pronounced influence on the stress range. Mean stress is the average of the maximum and minimum stress values for a cycle. Stress range is the algebraic difference between the maximum and minimum stress values. Several empirical formulas and graphical methods have been developed to show the influence of the mean stress on the stress range for failure.

Stress variations, or closely related parameters, must be dynamically sensed and then the exceedance level, or any other significant behavior factor, recorded by a digital method which accumulates counts.

Levels can be established from points plotted on an S–N diagram where S is the ordinate and N is the abscissa. An S–N curve can be graphically illustrated by plotting values of $S_1, S_2, S_3 \ldots S_x$ and $N_1, N_2, N_3, N_4 \ldots N_x$. Certain selected midvalues or points plotted on the S–N diagram may be bounded by horizontal reference lines representing certain stress levels, that may be stairstepped. The number of times that each selected stress level is exceeded may be counted, and these counts may be termed exceedance counts. If $n_x$ is the actual number of exceedance counts within a corresponding stress level, then by Minor's theory when $$\frac{n_x}{N_x} + \frac{n_{x-1}}{N_{x-1}} + \frac{n_{x-2}}{N_{x-2}} + \cdots \frac{n_1}{N_1} = 1$$

the fatigue limit has been reached. The fixed coefficients $$1/N_x, 1/N_{x-1}, 1/N_{x-2} \ldots$$

may be regarded as weighting functions from the S–N curve, applied to each level of stress exceedance. An exceedance level discriminator can be programmed or designed through logic circuitry to produce a single pulse when a certain event or event sequence occurs such as one or more stress levels being exceeded. If desired, the exceedance of higher stress levels can be weighted according to damage since the exceedance of higher levels obviously is more damaging. Similarly, the frequency at which a stress level is exceeded can also be weighted.

An object of this invention, therefore, is the provision of a novel damage intelligence system that senses, computes, and records and/or displays a quantitative indication of loads being incurred by an airframe structure.

Another object of this invention is the provision of a novel damage intelligence system, as set forth in the preceding object, that records and/or displays a direct comparison of these loads as to what is within safety margins or allowable.

Another object of this invention is the provision of a damage intelligence system that counts, and records and/or displays the number of times vertical and lateral dynamic loads exceed their allowable values.

Yet another object of this invention is the provision of a novel damage intelligence system for recording and/or displaying the vertical load factor at the center of gravity of a vehicle, such as an aircraft.

The invention further resides in certain novel features of construction, combinations, and arrangements of parts and further objects and advantages of the invention will be apparent to those skilled in tha art to which it pertains from the following description of the present preferred embodiment thereof described with reference to the accompanying drawings, which form a part of this specification, wherein the same reference numerals indicate corresponding parts throughout the several views, and in which.

Figure 1:
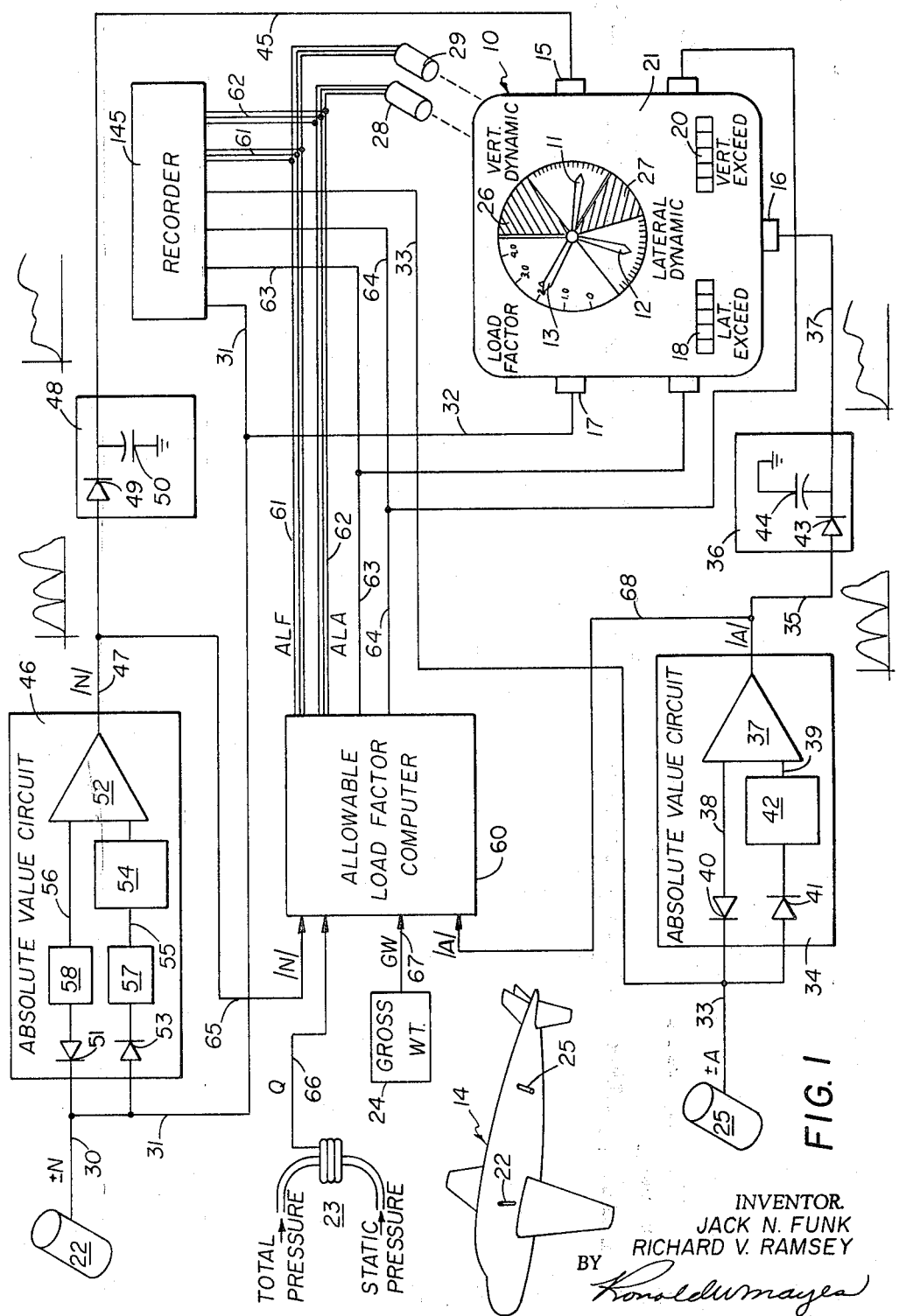
FIG. 1 is a schematic electromechanical diagram of an apparatus embodying the invention.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1 is an instrument display, hereinafter referred to as an instrument, is indicated generally by the reference numeral 10. The instrument 10 is preferably located in an instrument panel for a vehicle. The vehicle selected to show the best mode of carrying out this invention is preferably a fixed wing aircraft, such as a high-speed jet. The instrument 10 comprises galvanometer-type meters having needles 11, 12, and 13 for respectively indicating vertical dynamic loads, lateral dynamic loads, and an actual vertical load factor occurring in an airframe of an aircraft 14. Preferably the shafts of the needles 11, 12, and 13 are coaxial and are driven by galvanometers 15, 16 and 17, respectively, in a conventional manner. The number of times that the airframe has exceeded certain selected allowable load levels in lateral and vertical directions of the aircraft 14 are respectively indicated in the lateral exceedance counter 18 and a vertical exceedance counter 20 in the instrument 10. The instrument 10 has a frame or housing having a rectangular face 21. The lateral exceedance and vertical exceedance counters 18 and 20 are preferably similar in construction to the counters disclosed in United States Patent 3,059,233. However, it is to be understood that other counters can be used.

The actual vertical load factor, indicated by the needle 13, is measured in gravities often referred to as G's, and sensed by a vertical accelerometer 22 located at the center of gravity of the aircraft 14.

The allowable load factor for vertical dynamic loads and lateral dynamic loads, vary with aerodynamic pressure Q as derived from a total pressure and static pressure sensor 23, and aircraft gross weight GW from a computer source 24 having inputs from a fuel totalizer, payload, empty weight, and so forth. A pair of irises 26 and 27 are positioned by control transformers 29 and 28, respectively, operating as synchrorepeaters or receivers. The iris positioners 28, 29 drive the irises 27 and 26 to indicate the computed maximum permissible vertical dynamic and lateral dynamic load factors on the airframe of the aircraft 14.

The galvanometer 17 driving the actual load factor needle 13 receives an electrical analog signal in lines 30, 31, 32 from the vertical accelerometer 22, which measures the actual vertical load factor directly.

The lateral galvanometer 16, which drives the lateral dynamic load factor needle 12, receives an electrical analog signal from the lateral accelerometer 25 via a line 33, an absolute value circuit 34, a line 35, a filter 36, and a line 37.

The absolute value circuit 34 comprises a summing amplifier 37 having an output to the line 35 and inputs from lines 38 and 39. A diode 40 in the line 38 permits the passage of signals —A having a negative value from the accelerometer 25, whereas the line 39 has a diode 41 for permitting the passage of signals A having a positive value. The positive A signals passing the diode 41 pass through an inverter 42 so that the signals in both the lines 38 and 39 will have negative inputs to the summing amplifier 37. The amplifier 37 sums the electrical inputs and discharges a positive signal to the line 35 since the amplifier changes the sign of the signal from negative to plus.

The lateral filter 36 employs a diode 43 in the line 35 and a grounded capacitor 44, and may be referred to as a damping circuit. The function of the filter 36 is to cause lag in one direction, the down direction of the signal wave form, so that readings on the lateral dynamic meter as indicated by the lateral dynamic needle 12 will decay slowly following a lateral dynamic load factor peak. The lateral dynamic needle 12, therefore, does not jump or oscillate and give spurious indications. Preferably, the actual time constant governing the decay is produced by the capacitor shown and resistance not shown, in the galvanometer 16. Typical voltage wave forms of the outputs of the absolute value circuits and the filter or damping circuits are as shown in FIG. 1.

The lateral galvanometer 15 obtains an electrical analog signal in a line 45 and drives the vertical dynamic needle 11 in a manner similar to which the lateral dynamic needle 12 is driven. The vertical dynamic meter employs a circuit similar to that for the lateral dynamic meter 16. Electrical plus and minus output signals N from the vertical accelerometer 22 are fed via the line 30, an absolute value circuit 46, an output line 47, a filter circuit 48, and the line 45 to the vertical galvanometer 15.

The vertical filter circuit 48 corresponds to the lateral filter circuit 36 in that it employs a diode 49 and a grounded capacitor 50 for performing a damping function whereby the vertical dynamic meter readings as indicated by the vertical dynamic needle 11 decay slowly following a load factor peak. The actual time decay constant is produced by the capacitor 50 and a resistance, not shown, in the galvanometer 15 of the vertical dynamic meter.

The absolute value circuit 46 has a diode 51 for permitting the passage of wave signals having a minus value to a summing amplifier 52. A second diode 53 is connected in parallel to the diode 51 and allows the passage of signals having a plus value from the line 30. The signals from the diode 53 are passed through an inverter 54 in an input line 55 and to the summing amplifier 52. The minus signals from the diode 51 are passed to the summing amplifier 52 via an input line 56. The amplifier 52 sums the minus signals and discharges a plus signal into the discharge line 47. Preferably the input lines 55 and 56 of the summing amplifier 52 are provided with gain controls 57 and 58 for fixing different signal gains in the negative and positive load factor directions respectively, to the summing amplifier 52 since only positive values of vertical load factors on the aircraft, whether positive or negative, are preferred to be fed to an allowable load factor computer. A negative signal will be generated by the accelerometer 22 when a positive vertical load factor is applied to the aircraft 14. A positive signal will be generated by the accelerometer 22 when a negative load factor is applied to the aircraft 14. Accordingly, the vertical dynamic needle 11 will indicate either positive or negative vertical dynamic loads on the aircraft 14, and the lateral dynamic needle 12 will indicate the lateral dynamic loads on the aircraft 14 regardless of whether they are in the direction of the port or starboard sides of the aircraft 14.

Allowable load factor computer

Figure 2:
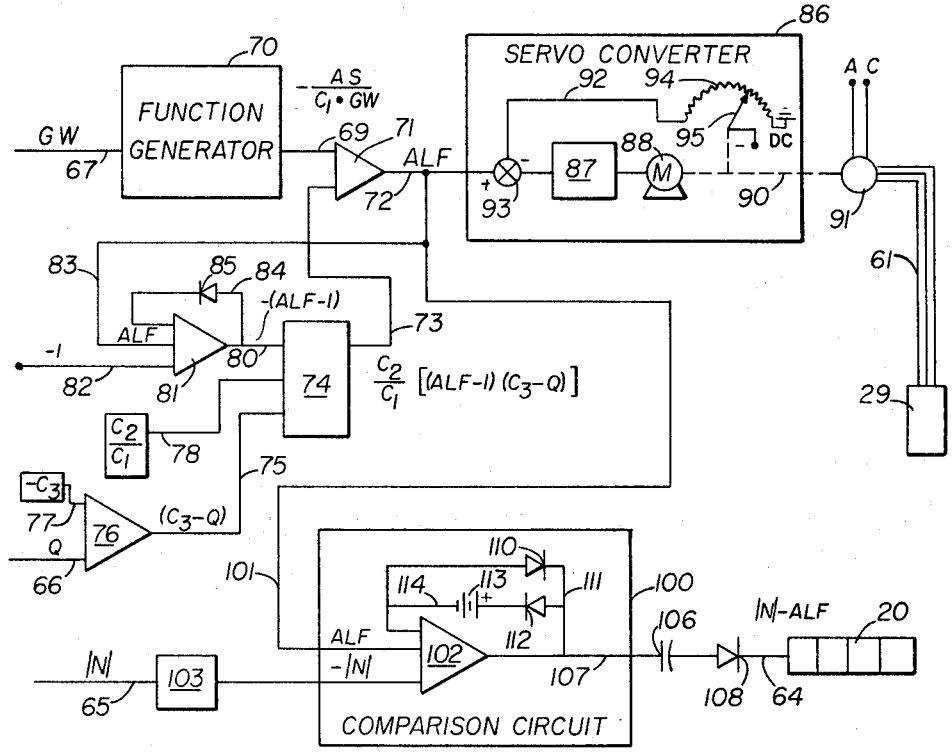
FIG. 2 is a schematic electromechanical diagram of an allowable load factor computer utilized in the apparatus of FIG. 1.
Figure 2:
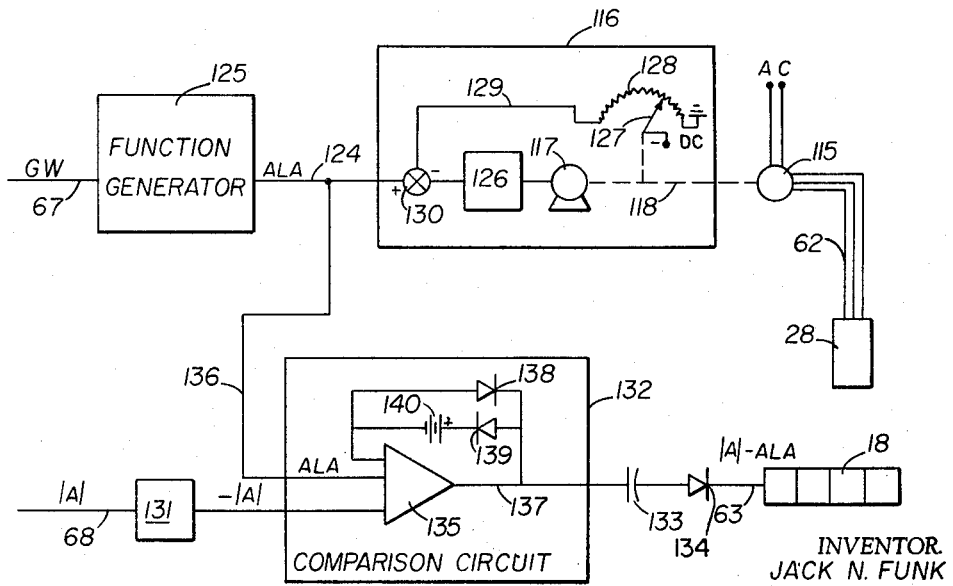

The computer for computing allowable load factor is indicated generally by reference numeral 60 in FIG. 1. The details of the allowable load factor computer 60 in its preferred form are shown in FIG. 2.

One function of the computer 60 is to provide electrical analog output voltage signals in synchro system triple lines 61 and 62 for respectively driving the iris positioners 29, 28 so that the irises 27 and 26 are suitably positioned in the vertical dynamic and lateral dynamic meters to indicate the maximum permissible vertical dynamic loads and lateral dynamic loads, respectively.

Another function of the computer 60 is to provide an output in lines 63, 64 for causing the counters 18 and 20 to respectively indicate the total number of times that the allowable lateral and positive vertical load factors have been exceeded by the airframe of the aircraft 14. These outputs are provided by computations based on inputs via lines 47 and 65 from the vertical accelerometer absolute value circuit 46, via a line 66 from a sensor 23 that provides aerodynamic pressure Q, via a line 67 from the gross weight computer 24, and via lines 35 and 68 from the lateral accelerometer absolute value circuit 34.

The computer 60 takes the available data of aerodynamic pressure Q and gross weight GW from which an allowable plus load factor ALF may be computed for a particular airplane. The actual equation which must be solved will vary between different aircraft and will be different for the vertical and lateral axes thereof.

FIG. 2 illustrates a computer circuit based upon an equation that applies to a Boeing B-52 aircraft vertical axis. This equation solved by the computer 60 for positioning the vertical dynamic iris 27 is as follows.

$$(1) \quad \frac{AS}{C_1 \cdot GW} - \frac{C_2}{C_1}[(ALF-1)(C_3-Q)] = ALF$$

Allowable load factor is represented by ALF, aerodynamic pressure is represented by Q, allowable stress is represented by AS, and empirically established constants are represented by $C_1$, $C_2$, and $C_3$. In the solution of the above Equation 1, the expression $(ALF-1)$ is given a value of zero when the expression $(ALF-1)$ is less than zero. An electrical analog voltage value representative of the expression $$-\frac{AS}{C_1 \cdot GW}$$

is provided in a line 69 by supplying an electrical signal proportional to the gross weight GW of the aircraft from the line 67 to a function generator 70. The signal in the line 69 is fed to a summing amplifier 71 for providing an output in a line 72 proportional to the allowable positive vertical load factor ALF by adding an electrical analog voltage proportional to minus $$\frac{C_2}{C_1}(ALF-1)(C_3-Q)$$

in a line 73. The signal in the line 73 is obtained from an electrical multiplier 74. An electrical analog input voltage proportional to $(C_3-Q)$ appears as an input in a line 75 to the multiplier 74. This signal to the line 75 is supplied by a summing amplifier 76 having an electrical analog input signal constant proportional to $-C_3$ in a line 77 and an electrical analog input in line 66 proportional to the dynamic pressure Q. A second input signal proportional to $C_2/C_1$ to the electrical multiplier 74 is supplied via a line 78.

A third input signal is supplied to the multiplier 74 via a line 80 from a summing amplifier 81. This third input signal is an electrical analog voltage proportional to the mathematical expression of $-(ALF-1)$. The amplifier 81 has two input lines 82 and 83. The input to the line 82 is an electrical voltage signal having a value proportional to $-1$. The input to the line 83 is an electrical signal having a value proportional to the allowable load factor ALF provided by the summing amplifier 71 and taken directly off the output line 72 of the amplifier 71. A feedback line 84 is connected from the output line 80 of the amplifier 81 to the input side of the amplifier 81. The feedback line 84 has a diode 85 for permitting the feedback of plus wave signals so as to null out any output signal having a plus value. An output signal is provided in the line 80 only when the expression $(ALF-1)$ is greater than zero. When the expression $(ALF-1)$ is less than zero there will be no output signal from the amplifier 81.

The output signal of the summing amplifier 71 provided in the line 72 is discharged to a servo converter 86 and more particularly drives a servo amplifier 87 and a motor 88. A shaft mechanism 90 driven by the motor 88 positions a rotor of an A.C. energized input coil in a synchro transmitter 91. The plus signal to the servo amplifier 87 is nulled by a minus feedback signal via a line 92 to a summing point 93. The minus signal in the line 92 is picked off of a grounded rheostat resistor 94 by a wiper 95 angularly positioned by the shaft of the motor 88. The wiper 95 is energized by a negative D.C. voltage. As the rotor carrying the coil of the transmitter 91 is turned, an analog voltage signal representative of ALF appears in the three lines 61 of a synchro system, comprising the iris positioner 29 and the transmitter 91.

Also included in the computer 60 is a comparison circuit 100 which produces an electrical signal pulse each time the absolute value of the vertical dynamic load has exceeded a given proportion of the allowable vertical load factor ALF. The pulse is then fed via the line 64 to the vertical exceedance counter 20 in the instrument 10. The total count of the number of times that the allowable vertical load factor ALF has been exceeded is displayed by the counter 20 of the instrument 10.

More particularly the comparison circuit 100 comprises an electrical analog voltage input signal ALF in a line 101 to a summing amplifier 102 from the line 72 forming the output of the summing amplifier 71. The other input to the amplifier 102 is supplied thereto via the line 65 connected to the output line 47 of the absolute value circuit 46. An inverter 103 is in the line 65 so as to provide a minus value of the absolute value of the actual load factor /N/ to the amplifier 102. The amplifier 102 compares the value of actual absolute vertical load factor /N/ to the value of the maximum allowable load factor ALF.

The output of the amplifier 102 is supplied to a capacitor 106 via a line 107, and then to a diode 108 that discharges a plus signal not greater than a predetermined voltage to the counter 20 via the line 64. The capacitor 106 and diode 108 in series permit the issue of discrete pulses having a plus value and proper wave form. The capacitor 106 shapes the waves and the diode 108 passes the positive waves, but prevents the passage of negative waves. A feedback circuit is applied across the amplifier 102 and is comprised of a diode 110 in line 111 that passess all negative waves to an input side of the amplifier 102. Another diode 112 is connected across the diode 110 and permits the passage of plus wave signals exceeding a predetermined voltage. A D.C. voltage source 113 of the predetermined value is connected in series with the diode 112 in a line 114.

Also forming a part of the computer 60 is an allowable lateral load computer for driving the iris positioner 28, and a comparison circuit for driving the lateral exceedance counter 18.

The purpose of the lateral load computer is to determine the allowable lateral acceleration permissible at a significant location in the aft body or tail of the aircraft 14. The position selected for lateral accelerometer 25 is preferably where the acceleration sensed would be most directly related to important structural load, such as the structure endangered by vertical stabilizer fin bending moments. In most cases, the allowable lateral acceleration sensed may be thought of as analogous to load factor on the vertical axis of the aircraft 14 where the allowable lateral acceleration ALA is inversely proportional to gross weight GW. This may be expressed as, (2)
$$ALA = \frac{K}{GW}$$

where ALA is the allowable lateral acceleration, K is an empirically established constant and GW is the gross weight of the aircraft. The iris positioner 23 is a control transformer receiving an electrical analog signal via the synchro lines 62 of a synchro system having a transmitter 115. A servo converter 116 has a motor 117 driving a mechanical linkage 118 for positioning a rotor carrying an A.C. electrically energized input coil. The servo converter 116 is driven by an electrical analog signal proportional to allowable lateral acceleration ALA supplied to a line 124 from a function generator 125. The generator 125 receives an input signal proportional to gross weight GW from the line 67. The signal in the line 124 drives a servo amplifier 126 which drives the motor 117 of the servo converter 116. The mechanical linkage 118 not only positions the rotor of the transmitter 115 but also positions a negatively charged wiper 127 on a grounded resistor 128 of a field rheostat. The wiper 127 is moved until a nulling signal is picked off and transmitted via a line 129 to a summing point 130 in the line 124 for nulling the input signal in the line 124 to the servo amplifier 126.

The counter 18, which records the number of times that the absolute value of the actual lateral acceleration /A/ exceeds the computed allowable lateral acceleration ALA, is driven by a wave signal /A/ transmitted via the line 68, and inverter 131, a comparison circuit 132 for limiting the waves to a plus value not exceeding a predetermined voltage, a capacitor 133 for shaping the waves, a diode 134 for passing only the plus values of the waves, and the line 63.

The comparison circuit 132 is similar to the comparison circuit 100. The circuit 132 has an amplifier 135 with inputs from the line 68 and a line 136 connected to the line 124. The amplifier 135 supplies a wave signal to an output line 137 having the capacitor 133 and the diode 134 therein. A feedback circuit, comprising a diode 138 connected in parallel with another diode 139 and a battery 140, is connected from the output line 137 to the input side of the amplifier 135. The diode 138 passes and returns all minus value waves and the diode 139 and the battery 140 pass and return all plus value waves having a voltage over the selected rated voltage of the battery 140.

In order that a permanent record of the information displayed on the instrument 10 is preserved, a recorder 145 is provided with signal inputs from the lines 31, 33, 61, 62, 63 and 64 supplied thereto for recordation preferably on nondestructible tape. Data from the tape can be tabulated from time to time for analysis. As pointed out hereinabove, Minor's equation can be used to plot a stress curve which can be used to empirically establish the fatigue life of the airplane 14 or perhaps alternatively discover the reason for a structural failure or loss of an aircraft. It is understood that although acceleration loads are being recorded, stresses can also be computed and recorded either directly or converted from the load and exceedance data on the tape in the recorder 145.

Figure 3:
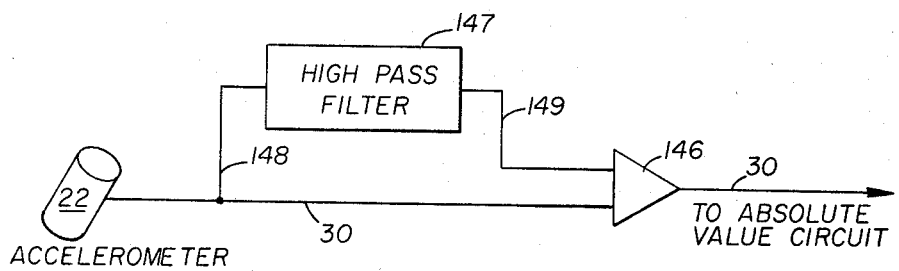
FIG. 3 is a schematic electromechanical diagram of an additional circuit in parallel which is a high pass filter.

In the event that the absolute values of the vertical and lateral dynamic load meters are desired to reflect the rate of fatigue damage to the airplane 14 as related to the frequency and amplitude of oscillating loads, such as generally result from turbulence, an electrical apparatus comprising an amplifier 146 and a high pass filter 147 of FIG. 3 can be applied in the output lines 30 and 33 of the vertical and lateral accelerometers 22 and 25, respectively, FIG. 1. When applied to the line 30, for example, the signal from the vertical accelerometer 22 is fed to the high pass filter 147 via an input line 148. The transfer function of the filter 147 is such that higher frequencies are passed at a higher gain which higher gain may be suitably conventionally obtained by a conventional amplifier having the required emphasis on higher frequencies. The output of the filter 147 is then fed via a line 149 to the summing amplifier 146 and summed with the original signal. Thus the higher rate of fatigue damage is reflected by a greater deflection of the needle 11. If the needle 11 overlaps with the iris 26, it can be taken to mean that action should be taken to remove the aircraft 14 from the environment, or action should be taken to reduce airspeed or change aircraft altitude to prevent excessive fatigue damage to the aircraft. It is recognized that the filter transfer function can be shaped to reduce the margin of allowable load in a manner consistent with fatigue, or stress, considerations as depicted between the relationship of the needle 11 to the iris 26.

Figure 4:
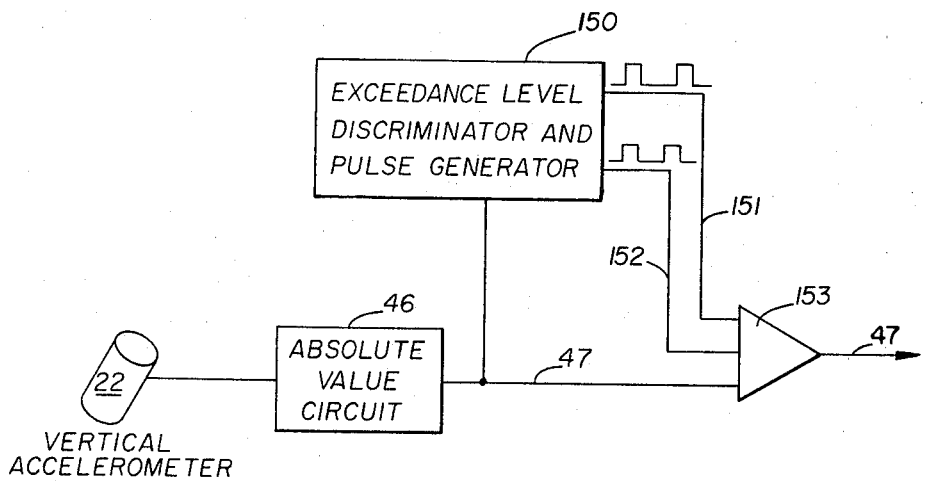
FIG. 4 is a schematic electromechanical diagram of yet another additional parallel circuit which counts exceedances above two levels and generates square pulses.

An alternate way of reflecting rate of fatigue damage in the dynamic meter readings, due to repetitions of various amplitudes of oscillating loads usually resulting from turbulence, is by the addition of an exceedance level discriminator and a pulse generator 150, FIG. 4. The discriminator 150 senses exceedances above selected levels in the line 47 and produces a pulse each time an exceedance of each level occurs. Two levels are indicated by the output lines 151, 152 in FIG. 4. All three outputs in lines 47, 151, and 152 are summed in an amplifier 153. The output of the amplifier is smoothed by the damping circuit 48 of FIG. 1 and fed to the vertical dynamic meter readings and thus causes a higher reading, the incremental signal increase from the amplifier 153 being proportional to the level and frequency of the load exceedances above two additional stairstep levels provided by the generator 150.

It will be understood that this invention can be modified to adapt it to various circumstances and conditions, and it is accordingly desired to comprehend within the purview of this invention such modifications as may be considered to fall within the scope of the appended claims.

What is claimed, is.

1. A damage intelligence system for an aircraft having an airframe, means for counting and indicating the number of times that dynamic vertical loads at a selected point in the airframe have exceeded a predetermined maximum allowable load factor value ALF, allowable load factor analog computer means for computing and generating an electrical analog signal each time said predetermined maximum allowable dynamic vertical load value ALF has been exceeded and having an output connected to said counter and indicating means for transmitting said signal from said computer means to said counter and indicating means, absolute value circuit means for continuously generating and transmitting electrical analog signals /N/ proportional to the absolute values of the vertical acceleration sensed at said point in the airframe, accelerometer means located at said point in the airframe connected to said absolute value circuit means and continuously sensing and generating electrical analog signals ±N proportional to sensed vertical acceleration, means for continuously providing electrical analog signals GW proportional to the instantaneous gross weight of the aircraft to said computer means, means for continuously providing electrical analog signals Q proportional to the instantaneous aerodynamic pressure on the aircraft to said computer means, said computer means having means for continuously generating an electrical analog signal ALF proportional to maximum allowable vertical load factor by continuously solving the equation of $$\frac{AS}{C_1 \cdot GW} - \frac{C_2}{C_1}[(ALF-1)(C_3-Q)] = ALF$$

where $(ALF-1)$ is greater than or equal to zero, and where empirical constants are represented by $C_1$ and $C_2$ and $C_3$ and allowable vertical stress on the airframe at the given point therein is represented by AS, said computer means having comparison circuit means for continuously generating electrical analog signals proportional to $/N/-ALF$ and having counting and indicating signal limiting means for limiting the values of said signals $/N/-ALF$ to electrical signals of only one sign and not exceeding a selected maximum value, said output of said computer means transmitting said signals generated by said counting and indicating signal limiting means to said counting and indicating means, first readout means for indicating the instantaneous values of allowable load factor ALF, and second readout means for indicating the instantaneous values of vertical acceleration N, and recorder means for continuously recording the vertical dynamic loads N and the maximum allowable vertical load factor ALF and the number of times the maximum allowable load factor ALF has been exceeded.

2. A damage intelligence system for an aircraft having an airframe, means for counting and indicating the number of times that dynamic vertical loads at a selected point in the airframe have exceeded a predetermined maximum allowable load factor value ALF, computer means for computing and generating an electrical analog signal each time said predetermined maximum allowable dynamic vertical load value ALF has been exceeded and having an output connected to said counter and indicating means for transmitting said signal from said computer means to said counter and indicating means, absolute value circuit means for continuously generating and transmitting electrical analog signals $/N/$ proportional to the absolute values of the vertical acceleration sensed at said point in the airframe, accelerometer means located at said point in the airframe connected to said absolute value circuit means and continuously sensing and generating electrical analog signals $\pm N$ proportional to sensed vertical acceleration, means for continuously providing electrical analog signals GW proportional to the instantaneous gross weight of the aircraft to said computer means, and means for continuously providing electrical analog signals Q proportional to the instantaneous aerodynamic pressure on the aircraft to said computer means, said computer means having means for continuously generating an electrical analog signal ALF proportional to maximum allowable vertical load factor by continuously solving the equation of $$\frac{AS}{C_1 \cdot GW} - \frac{C_2}{C_1}[(ALF-1)(C_3-Q)] = ALF$$

where $(ALF-1)$ is greater than or equal to zero, and where empirical constants are represented by $C_1$ and $C_2$ and $C_3$ and allowable vertical stress on the airframe at the given point therein is represented by AS, said computer means having comparison circuit means for continuously generating electrical analog signals proportional to $/N/-ALF$ and having counting and indicating signal limiting means for limiting the values of said signals $/N/-ALF$ to electrical signals of only one sign and not exceeding a selected maximum value, and said output of said computer means transmitting said signals generated by said counting and indicating signal limiting means to said counting and indicating means.

3. A damage intelligence system for an aircraft having an airframe, in combination comprising, an allowable load factor computer means for continuously generating electrical analog signals ALF proportional to a fatigue-stress-related maximum allowable vertical load factor by continuously solving the equation of $$\frac{AS}{C_1 \cdot GW} - \frac{C_2}{C_1}[(ALF-1)(C_3-Q)] = ALF$$

where $(ALF-1)$ is greater than or equal to zero, and where empirical constants are represented by $C_1$ and $C_2$ and $C_3$ and allowable vertical stress on the airframe at a selected point therein is represented by AS, means for continuously providing electrical analog signals GW proportional to the instantaneous gross weight of the aircraft to said computer means, means for continuously providing electrical analog signals Q proportional to the instantaneous aerodynamic pressure on the aircraft to said computer means, and readout means for indicating the instantaneous values of said fatigue-stress-related allowable load factor ALF, and recorder means for continuously recording said fatigue-stress-related maximum allowable vertical load factor ALF.

4. A damage intelligence system for an aircraft having an airframe, means for counting and indicating the number of times that dynamic vertical loads at a selected point in the airframe have exceeded a predetermined maximum allowable load factor value ALF, allowable load factor analog computer means for computing and generating an electrical analog signal each time said predetermined maximum allowable dynamic vertical load value ALF has been exceeded, said analog computer having an output connected from said computer means to said counter and indicating means for transmitting said signal from said computer means to said counter and indicating means, absolute value circuit means for continuously generating and transmitting electrical analog signals $/N/$ proportional to the absolute values of the vertical acceleration sensed at said point in the airframe, and accelerometer means located at said point in the airframe connected to said absolute value circuit means, said accelerometer means continuously sensing and generating electrical analog signals $\pm N$ proportional to sensed vertical acceleration, said computer means also continuously generating an electrical analog signal of maximum allowable load factor ALF, said computer means having comparison circuit means for continuously generating electrical analog signals proportional to $/N/-ALF$ and having counting and indicating signal limiting means for limiting the values of said signals $/N/-ALF$ to electrical signals of only one sign and not exceeding a selected maximum value, and said output of said computer means transmitting said signals generated by said counting and indicating signal limiting means to said counting and indicating means.

5. An analog computer for generating an electrical analog signal ALF proportional to the maximum allowable vertical load factor at a point in an aircraft by solving the equation of $$\frac{AS}{C_1 \cdot GW} - \frac{C_2}{C_1}[(ALF-1)(C_3-Q)] = ALF$$

means for continuously generating an electrical analog signal GW proportional to gross weight of the aircraft, function generator means for continuously generating an electrical analog signal proportional to $$\frac{-AS}{C_1 \cdot GW}$$

where $$\frac{AS}{C_1 \cdot GW}$$

is a function of the gross weight GW, first summing amplifier means, multiplier means continuously generating an electrical analog signal proportional to $$\frac{C_2}{C_1}[(ALF-1)(C_3-Q)]$$

said first summing amplifier means summing said signal $$\frac{-AS}{C_1 \cdot GW}$$

and said signal $$\frac{C_2}{C_1}[(ALF-1)(C_3-Q)]$$

and providing said electrical analog output signal ALF proportional to the maximum allowable vertical load factor of the aircraft, second summing amplifier means having an output connected as an input to said multiplier means and generating an electrical analog signal proportional to $-(ALF-1)$, conductor means connecting the output of said first summing amplifier means as an input to said second summing amplifier means, means generating an electrical analog signal proportional to $-1$ and connected as an input to said second summing amplifier means, diode means connecting the output of said second summing amplifier means as an input thereto for preventing the value of the output $(ALF-1)$ from falling below the value of zero, means for continuously generating an electrical analog signal proportional to $C_2/C_1$ and transmitting said signal $C_2/C_1$ to said multiplier means, third summing amplifier means for generating and transmitting an electrical analog signal proportional to $(C_3-Q)$ and transmitting said signal $(C_3-Q)$ to said multiplier means, means continuously generating an electrical analog signal proportional to $-C_3$ and transmitting said signal $-C_3$ as an input to said third summing amplifier means, and means generating and transmitting an electrical analog signal proportional to instantaneous aerodynamic pressure Q as an input to said third summing amplifier means.

6. A damage intelligence system for an aircraft having an airframe, means for counting and indicating the number of times that dynamic lateral loads at a selected point in the airframe have exceeded a predetermined maximum allowable load factor value ALA, computer means for computing and generating an electrical analog signal each time said predetermined maximum allowable dynamic lateral load value ALA has been exceeded, and having an output connected to said counter and indicating means for transmitting said signal from said computer means to said counter and indicating means, absolute value circuit means for continuously generating and transmitting electrical analog signals /A/ proportional to the absolute values of the lateral acceleration sensed at said point in the airframe, accelerometer means located at said point in the airframe connected to said absolute value circuit means and continuously sensing and generating electrical analog signals ±A proportional to sensed lateral acceleration, said computer means having function generator means for continuously generating an electrical analog signal ALA proportional to the maximum allowable lateral load factor as a function of the gross weight GW, and means connected as an input to said function generator means for continuously providing electrical analog signals GW proportional to the instantaneous gross weight of the aircraft to said computer means, said computer means having comparison circuit means for continuously generating electrical analog signals proportional to /A/−ALA and having counting and indicating signal limiting means for limiting the values of said signals /A/−ALA to electrical signals of only one sign and not exceeding a selected maximum value, and said output of said computer means transmitting said signal generated by said counting and indicating signal limiting means to said counting and indicating means.

7. A damage intelligence system for an aircraft having an airframe, means for counting and indicating the number of times that acceleration loads at a selected point in the airframe have exceeded a predetermined maximum allowable load factor value, absolute value circuit means for continuously generating and transmitting first electrical analog signals proportional to the absolute values of acceleration loads sensed at said point in the airframe, means for continuously generating second electrical analog signals proportional to the maximum allowable load factor value, comparison circuit means for continuously generating third electrical analog signals proportional to the difference between said first and second signals, and counting and indicating signal limiting means for generating fourth electrical analog signals by limiting said third signals to a selected maximum value of only one sign, and said limiting means transmitting said fourth signals to said counting and indicating means.

8. A damage intelligence system for an aircraft having an airframe, means for counting and indicating the number of times that sensed acceleration loads at a selected point in the airframe have exceeded a predetermined maximum allowable load factor value, accelerometer means at said selected point for sensing and generating first electrical analog signals proportional to the sensed acceleration loads, high pass filter means connected to an output of said accelerometer means for generating second electrical analog signals by passing high frequencies of said first signals above a predetermined level and passing said frequencies at a higher gain, summing amplifier means for generating and transmitting third electrical analog signals obtained by summing said first and second electrical analog signals, absolute value circuit means for continuously generating and transmitting fourth electrical analog signals proportional to the absolute values of said third signals, means for continuously generating fifth electrical analog signals proportional to the maximum allowable load factor value, comparison circuit means for continuously generating sixth electrical analog signals proportional to the difference between said fourth and fifth signals, and counting and indicating signal limiting means for generating seventh electrical analog signals by limiting said sixth signals to a selected maximum value of only one sign, and said limiting means transmitting said seventh signals to said counting and indicating means.

9. A damage intelligence system for an aircraft having an airframe, means for counting and indicating the number of times that sensed accelerometer loads at a selected point in the airframe have exceeded a predetermined maximum allowable load factor value, accelerometer means at said selected point for generating first electrical analog signals proportional to the sensed acceleration loads, absolute value circuit means connected to the output of said accelerometer means for continuously generating and transmitting second electrical analog signals proportional to the absolute values of said first signals, exceedance level discriminator and pulse generator means connected to the output of said absolute value circuit means for generating a signal for each level of frequency exceeded, means summing each of said second signals and each of said signals generated by said exceedance level discriminator and pulse generator means and generating third electrical analog signals proportional to the sums thereof, means for continuously generating fourth electrical analog signals proportional to the maximum allowable load factor value, comparison circuit means connected to said summing means and said load factor value means for continuously generating fifth electrical analog signals proportional to the difference between said third and fourth electrical analog signals, and counting and indicating signal limiting means for generating sixth electrical analog signals by limiting said fifth signals to a selected maximum value of only one sign, and said limiting means transmitting said sixth signals to said counting and indicating means.

References Cited

UNITED STATES PATENTS

| | | | |
|---|---|---|---|
| 2,869,804 | 1/1959 | Muinch et al. | 235—150.2 |
| 2,879,053 | 3/1959 | Weaver | 73—88.5 |
| 3,077,575 | 2/1963 | Beck et al. | 340—27 |
| 3,104,546 | 9/1963 | Hauptman | 73—178 |
| 3,233,455 | 2/1966 | Goldin | 73—178 |
| 3,267,271 | 8/1966 | Kindle et al. | 235—193 |

MALCOLM A. MORRISON, *Primary Examiner.*

I. KESCHNER, W. M. JOHNSON, *Assistant Examiners.*